United States Patent
Song et al.

(10) Patent No.: US 10,826,395 B2
(45) Date of Patent: Nov. 3, 2020

(54) VOLTAGE CONVERTER, METHOD FOR CONTROLLING VOLTAGE CONVERTER, AND VOLTAGE CONVERSION SYSTEM

(71) Applicant: Huawei Technologies Co., Ltd., Shenzhen (CN)

(72) Inventors: Jun Song, Shenzhen (CN); Pengfei Wang, Xi'an (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 16/539,573

(22) Filed: Aug. 13, 2019

(65) Prior Publication Data

US 2019/0372462 A1  Dec. 5, 2019

Related U.S. Application Data

(63) Continuation of application No. PCT/CN2018/077093, filed on Feb. 24, 2018.

(30) Foreign Application Priority Data

Feb. 28, 2017  (CN) .......................... 2017 1 0113455

(51) Int. Cl.
*H02M 3/158* (2006.01)
*H02M 3/07* (2006.01)
(Continued)

(52) U.S. Cl.
CPC ............... *H02M 3/158* (2013.01); *H02J 7/00* (2013.01); *H02M 3/07* (2013.01); *H02J 2207/20* (2020.01);
(Continued)

(58) Field of Classification Search
CPC ......... H02M 3/158; H02M 3/07; H02M 3/073
See application file for complete search history.

(56) References Cited

U.S. PATENT DOCUMENTS 6,304,068 B1 * 10/2001 Hui .......................... H02M 3/07
  323/225
7,239,194 B2 * 7/2007 Azrai ....................... H01L 23/50
  257/298
(Continued)

FOREIGN PATENT DOCUMENTS

CN  101459376 A  6/2009
CN  102377324 A  3/2012
(Continued)

OTHER PUBLICATIONS

Machine Translation and Abstract of Chinese Publication No. CN105141131, Dec. 9, 2015, 6 pages.
(Continued)

*Primary Examiner* — Thienvu V Tran
*Assistant Examiner* — Sisay G Tiku
(74) *Attorney, Agent, or Firm* — Conley Rose, P.C.

(57) ABSTRACT

A voltage converter includes a third switch element and a second energy storage element, and an energy storage circuit comprising a first switch element, a second switch element, and a first energy storage element. In a time period, the first switch element is in an on state, the second switch element and the third switch element are in an off state, and a voltage source coupled to the voltage converter charges the first energy storage element and the second energy storage element, and in a following time period, the first switch element is in an off state, the second switch element and the third switch element are in an on state, the first energy storage element and the second energy storage element discharge to a load coupled to the voltage converter.

20 Claims, 5 Drawing Sheets

(51) Int. Cl.
*H02J 7/00* (2006.01)
*H02M 1/00* (2006.01)

(52) U.S. Cl.
CPC ............... *H02M 2001/0048* (2013.01); *H02M 2003/072* (2013.01)

(56) References Cited

U.S. PATENT DOCUMENTS

| | | | | |
|---|---|---|---|---|
| 8,264,273 | B2* | 9/2012 | MacFarlane | H02M 3/07 327/536 |
| 8,981,838 | B1* | 3/2015 | Chuang | H02M 3/07 327/536 |
| 9,111,601 | B2* | 8/2015 | Cassia | G11C 5/145 |
| 9,160,166 | B2* | 10/2015 | Fernald | H02J 1/00 |
| 9,906,123 | B2* | 2/2018 | Tang | H02M 3/07 |
| 9,912,297 | B2* | 3/2018 | Khlat | H03F 1/0227 |
| 9,929,646 | B2* | 3/2018 | Notoya | H02M 3/07 |
| 9,973,147 | B2* | 5/2018 | Khlat | H03F 3/68 |
| 10,505,444 | B1* | 12/2019 | Cical | H02M 3/07 |
| 2009/0085548 | A1 | 4/2009 | Suh et al. | |
| 2009/0309566 | A1* | 12/2009 | Shiu | H02M 3/07 323/283 |
| 2011/0006743 | A1 | 1/2011 | Fabbro | |
| 2011/0018619 | A1* | 1/2011 | Cassia | H02M 3/07 327/537 |
| 2011/0285369 | A1 | 11/2011 | Cuk | |
| 2012/0187932 | A1* | 7/2012 | Singnurkar | H02M 3/07 323/282 |
| 2013/0038305 | A1* | 2/2013 | Arno | H02M 3/158 323/282 |
| 2014/0022006 | A1* | 1/2014 | Lin | H02M 3/07 327/536 |
| 2014/0268888 | A1 | 9/2014 | Lv | |
| 2015/0015225 | A1 | 1/2015 | Cheng | |
| 2015/0097546 | A1 | 4/2015 | Pan et al. | |
| 2015/0145497 | A1 | 5/2015 | Torres et al. | |
| 2020/0112177 | A1* | 4/2020 | Song | H02J 7/00045 |
| 2020/0127484 | A1* | 4/2020 | Song | H02M 3/158 |

FOREIGN PATENT DOCUMENTS

| CN | 104283417 A | 1/2015 |
|---|---|---|
| CN | 104660041 A | 5/2015 |
| CN | 105141131 A | 12/2015 |
| CN | 106208698 A | 12/2016 |
| CN | 106685219 A | 5/2017 |

OTHER PUBLICATIONS

Machine Translation and Abstract of Chinese Publication No. CN106208698, Dec. 7, 2016, 29 pages.
Machine Translation and Abstract of Chinese Publication No. CN106685219, May 17, 2017, 33 pages.
Hsieh, Y., et al, "High-Conversion-Ratio Bidirectional DC-DC Converter With Coupled Inductor," IEEE Transactions on Industrial Electronics, vol. 61, No. 1, Jan. 2014, pp. 210-222.
Foreign Communication From A Counterpart Application, PCT Application No. PCT/CN2018/077093, English Translation of International Search Report dated Apr. 17, 2018, 2 pages.
Foreign Communication From A Counterpart Application, PCT Application No. PCT/CN2018/077093, English Translation of Written Opinion dated Apr. 17, 2018, 5 pages.
Foreign Communication From A Counterpart Application, Chinese Application No. 2017101134558, Chinese Office Action dated Jun. 28, 2018, 5 pages.
Foreign Communication From A Counterpart Application, European Application No. 18760773.4, Extended European Search Report dated Sep. 27, 2019, 8 pages.

* cited by examiner

Send a first driving signal to a first switch element, and send a second driving signal to a second switch element and a third switch element, so that a voltage source coupled to a voltage converter charges a first energy storage element and a second energy storage element in a first time period, where the first driving signal is used to control the first switch element to be in an on state in the first time period, and the second driving signal sent to the second switch element and the third switch element is used to control the second switch element and the third switch element to be in an off state in the first time period ∽ S410

Send a third driving signal to the first switch element, and send a fourth driving signal to the second switch element and the third switch element, so that the first energy storage element and the second energy storage element separately discharge, in a second time period following the first time period, to a load coupled to the voltage converter, where the third driving signal is used to control the first switch element to be in an off state in the second time period, and the fourth driving signal sent to the second switch element and the third switch element is used to control the second switch element and the third switch element to be in an on state in the second time period ∽ S420

VOLTAGE CONVERTER, METHOD FOR CONTROLLING VOLTAGE CONVERTER, AND VOLTAGE CONVERSION SYSTEM

CROSS-REFERENCE TO RELATED APPLICATION

This application is a continuation of International Application No. PCT/CN2018/077093, filed on Feb. 24, 2018, which claims priority to Chinese Patent Application No. 201710113455.8, filed on Feb. 28, 2017. The disclosures of the aforementioned applications are hereby incorporated by reference in their entireties.

TECHNICAL FIELD

This application relates to the field of circuits, and more specifically, to a voltage converter, a method for controlling a voltage converter, and a voltage conversion system.

BACKGROUND

Because of characteristics such as high energy density, safety, and reliability, lithium batteries are always widely applied to mobile devices. With maturity of technologies of electric vehicles, lithium batteries are also widely used to provide driving energy to the electric vehicles. While the lithium batteries are widely applied, power that can be stored in the lithium batteries is also continuously increased with development of sciences and technologies. Accordingly, it has gradually become a necessity to fast charge a high-capacity battery.

In a battery charging system, a most kernel part usually includes a buck circuit, where the buck circuit is a direct-current to direct-current buck conversion circuit whose function is to transfer energy from a high-voltage power source to a battery based on a voltage required by the battery. Energy is lost in the transfer process, and the lost energy is converted into heat to make temperature of the system rise. To save energy and reduce heat generation in narrow and small application space as much as possible, direct-current to direct-current transfer efficiency becomes a key to a system application.

SUMMARY

This application provides a voltage converter, a method for controlling a voltage converter, and a voltage conversion system, to improve energy conversion efficiency of the voltage converter.

According to a first aspect, a voltage converter is provided. The voltage converter includes an energy storage circuit, where the energy storage circuit includes a first switch element, a second switch element, and a first energy storage element, and the voltage converter further includes a first external terminal, a second external terminal, a third switch element, and a second energy storage element, where a first terminal of the first switch element is coupled to the first external terminal, a second terminal of the first switch element is coupled to a first terminal of the first energy storage element and a first terminal of the second switch element, a second terminal of the second switch element is coupled to the second external terminal, a second terminal of the first energy storage element is coupled to a first terminal of the third switch element and a first terminal of the second energy storage element, a second terminal of the second energy storage element is coupled to the second external terminal, and a second terminal of the third switch element is grounded, in a first time period, the first switch element is in an on state, the second switch element and the third switch element are in an off state, and a voltage source coupled to the voltage converter charges the first energy storage element and the second energy storage element, and in a second time period following the first time period, the first switch element is in an off state, the second switch element and the third switch element are in an on state, the first energy storage element and the second energy storage element separately discharge to a load coupled to the voltage converter.

In the voltage converter provided in this embodiment of this application, by enabling the voltage source coupled to the voltage converter to charge the first energy storage element and the second energy storage element in the voltage converter in the first time period, and enabling the first energy storage element and the second energy storage element to separately discharge in the second time period and provide energy to the load coupled to the voltage converter, a circuit loss can be reduced, and energy conversion efficiency can be improved.

Optionally, the first energy storage element and the second energy storage element are of different device types.

Optionally, the first energy storage element is a capacitor, and the second energy storage element is an inductor.

Optionally, the first external terminal of the voltage converter is configured to connect to the voltage source, and the second external terminal of the voltage converter is configured to connect to the load.

In this case, optionally, an input voltage provided by the voltage source to the voltage converter is greater than a voltage between two ends of the load, that is, the voltage converter is a buck converter.

Optionally, the first external terminal of the voltage converter is configured to connect to the load, and the second external terminal of the voltage converter is configured to connect to the voltage source.

In this case, optionally, an input voltage provided by the voltage source to the voltage converter is less than a voltage between two ends of the load, that is, the voltage converter is a boost converter.

In a first possible implementation of the first aspect, the energy storage circuit further includes M third energy storage elements, M fourth switch elements, M fifth switch elements, and M sixth switch elements, where M is an integer greater than or equal to 1, a first terminal of a third energy storage element i of the M third energy storage elements is coupled to a second terminal of a fourth switch element i of the M fourth switch elements and a first terminal of a fifth switch element i of the M fifth switch elements, where i is an integer greater than or equal to 1 and less than or equal to M, a second terminal of the fifth switch element i is coupled to the second external terminal, and a second terminal of a sixth switch element i is grounded, a first terminal of a fourth switch element 1 of the M fourth switch elements is coupled to the first terminal of the first switch element, and if i is less than M, a second terminal of the third energy storage element i is coupled to a first terminal of the sixth switch element i of the M sixth switch elements and a first terminal of a fourth switch element i+1 of the M fourth switch elements, or if i is equal to M, a second terminal of the third energy storage element i is coupled to a first terminal of the sixth switch element i and the first terminal of the first switch element.

With reference to the foregoing possible implementations of the first aspect, in a second possible implementation of the first aspect, in the first time period, all of the M fourth switch elements are in an on state, all of the M fifth switch elements and the M sixth switch elements are in an off state, and the voltage source further charges the M third energy storage elements, and in the second time period, the M fourth switch elements are in an off state, the M fifth switch elements and the M sixth switch elements are in an on state, and the M third energy storage elements discharge to the load.

In this way, the voltage source further charges one or more third energy storage elements in the voltage converter in the first time period, and the one or more third energy storage elements discharges in the second time period and provides energy to the load. This can further reduce the circuit loss, and further improve the energy conversion efficiency of the voltage converter.

With reference to the foregoing possible implementations of the first aspect, in a third possible implementation of the first aspect, the voltage converter further includes a seventh switch element, where a first terminal of the seventh switch element is coupled to the first terminal of the first switch element, a second terminal of the seventh switch element is coupled to the second terminal of the first energy storage element, the first terminal of the second energy storage element, and the first terminal of the third switch element, and the seventh switch element is in an off state in both the first time period and the second time period.

Optionally, the seventh switch element may be configured to enable the energy storage circuit to be in an operating state or a bypass state, that is, the seventh switch element may be configured to bypass the energy storage circuit.

With reference to the foregoing possible implementations of the first aspect, in a fourth possible implementation of the first aspect, in a third time period, the seventh switch element is in an on state, all of the first switch element, the second switch element, and the third switch element are in an off state, and the voltage source charges the second energy storage element, and in a fourth time period following the third time period, the seventh switch element, the first switch element, and the second switch element are in an off state, the third switch element is in an on state, and the second energy storage element discharges to the load.

Optionally, in the third time period and the fourth time period, an energy storage element in the energy storage circuit is in a bypass state, that is, the first energy storage element or the first energy storage element and the M third energy storage elements in the energy storage circuit are in a bypass state. In this case, optionally, an energy storage element in an operating state in the voltage converter is the second energy storage element.

In this way, by controlling the seventh switch element, the voltage converter can be switched between different operating modes, thereby increasing scenarios to which the voltage converter is applicable.

According to a second aspect, a method for controlling a voltage converter is provided. The method includes steps performed by a controller in the voltage converter according to the first aspect or any possible implementation of the first aspect.

According to a third aspect, a computer readable medium is provided, and is configured to store a computer program, where the computer program includes instructions for performing the method according to the second aspect or any possible implementation of the second aspect.

According to a fourth aspect, another voltage converter is provided. The voltage converter is configured to convert an input voltage provided by a voltage source and then provide the converted input voltage to a load. The voltage converter includes a switch circuit, a first energy storage element, and a second energy storage element, the switch circuit is configured to switch on a first charging loop in a first time period, where in the first charging loop, the voltage source coupled to the voltage converter charges the first energy storage element and the second energy storage element, and the switch circuit is further configured to switch off the first charging loop in a second time period following the first time period, and switch on a first discharging loop and a second discharging loop, where in the first discharging loop, the first energy storage element provides energy to the load, and in the second discharging loop, the second energy storage element provides energy to the load.

The voltage converter provided in this embodiment of this application includes the switch circuit, the first energy storage element, and the second energy storage element, where the switch circuit is configured to switch on the first charging loop in the first time period, where in the first charging loop, an input terminal of the voltage converter provides energy to the first energy storage element, the second energy storage element, and the load, and is further configured to switch off the first charging loop in the second time period, and switch on at least one first discharging loop and at least one second discharging loop, where in the first discharging loop, the first energy storage element discharges to the load, and in the second discharging loop, the second energy storage element discharges to the load. Therefore, a circuit loss can be reduced, and energy conversion efficiency can be improved.

Optionally, the first energy storage element and the second energy storage element may be of different element types.

Optionally, the first energy storage element is a capacitor, and the second energy storage element is an inductor.

Optionally, an energy storage element in the first discharging loop is the first energy storage element.

Optionally, the first discharging loop may not include an energy storage element other than the first energy storage element, for example, may not include an inductor.

Optionally, the voltage converter may have a first external terminal and a second external terminal.

Optionally, the first external terminal of the voltage converter may be configured to connect to the voltage source, and the second external terminal of the voltage converter may be configured to connect to the load. In this case, an input voltage provided by the voltage source may be greater than a voltage between two ends of the load.

Optionally, the first external terminal of the voltage converter may be configured to connect to the load, and the second external terminal of the voltage converter may be configured to connect to the voltage source. In this case, an input voltage provided by the voltage source may be less than a voltage between two ends of the load.

In a first possible implementation of the fourth aspect, the switch circuit includes a first switch element, where the first switch element is connected in series in the first charging loop.

Optionally, the first switch element may be in an on state in the first time period, and be in an off state in the second time period.

Optionally, a first terminal of the first switch element is connected to a first external terminal of the voltage converter, and a second terminal of the first switch element is connected to a first terminal of the first energy storage element.

With reference to the foregoing possible implementations of the fourth aspect, in a second possible implementation of the fourth aspect, the switch circuit includes a second switch element, where the second switch element is connected in series in the first discharging loop.

Optionally, the second switch element may be configured to switch on or switch off the first discharging loop.

Optionally, the second switch element may be in an off state in the first time period, and be in an on state in the second time period.

Optionally, a first terminal of the second switch element is connected to the first terminal of the first energy storage element, and a second terminal of the second switch element is connected to the second external terminal of the voltage converter.

In this case, the second terminal of the first switch element may be connected to the first terminal of the first energy storage element and the first terminal of the second switch element.

With reference to the foregoing possible implementations of the fourth aspect, in a third possible implementation of the fourth aspect, the switch circuit includes a third switch element, where the third switch element is connected in series in the second discharging loop.

Optionally, the third switch element may be configured to switch on or switch off the second discharging loop.

Optionally, the third switch element may be connected in series in both the first discharging loop and the second discharging loop.

Optionally, the third switch element may be in an off state in the first time period, and be in an on state in the second time period.

Optionally, a first terminal of the third switch element is connected to the second terminal of the first energy storage element, and a second terminal of the third switch element k is grounded.

Optionally, the second terminal of the first energy storage element is further connected to a first terminal of the second energy storage element, and a second terminal of the second energy storage element is connected to the second external terminal of the voltage converter.

With reference to the foregoing possible implementations of the fourth aspect, in a fourth possible implementation of the fourth aspect, the voltage converter further includes M third energy storage elements, where M is an integer greater than or equal to 1, and in the first charging loop, the voltage source is further configured to charge the M third energy storage elements, the switch circuit is further configured to switch on, in the second time period, M third discharging loops corresponding to the M third energy storage elements, where in the third discharging loop, the third energy storage element corresponding to the third discharging loop discharges and provides energy to the load.

Optionally, in the first charging loop, the voltage source may charge all of the M third energy storage elements.

Optionally, the M third discharging loops may be in a one-to-one correspondence with the M third energy storage elements. Optionally, a quantity of third discharging loops in an on state in the second time period may be less than M.

With reference to the foregoing possible implementations of the fourth aspect, in a fifth possible implementation of the fourth aspect, the switch circuit may further include M fourth switch elements, M fifth switch elements, and M sixth switch elements, where the M fourth switch elements are connected in series in the first charging loop, and the fifth switch element and the sixth switch element are connected in series in the third discharging loop.

Optionally, a first terminal of a third energy storage element i of the M third energy storage elements is coupled to a second terminal of a fourth switch element i of the M fourth switch elements and a first terminal of a fifth switch element i of the M fifth switch elements, and a second terminal of the third energy storage element i is coupled to a first terminal of a sixth switch element i of the M sixth switch elements, where i is an integer greater than or equal to 1 and less than or equal to M, a second terminal of the fifth switch element i is coupled to the second external terminal of the voltage converter, and a second terminal of the sixth switch element i is grounded, and a first terminal of a fourth switch element 1 of the M fourth switch elements is coupled to the first external terminal of the voltage converter.

Optionally, if i is less than M, the second terminal of the third energy storage element i is further coupled to a first terminal of a fourth switch element i+1 of the M fourth switch elements, or if i is equal to M, the second terminal of the third energy storage element i is further coupled to the first terminal of the first switch element.

With reference to the foregoing possible implementations of the fourth aspect, in a sixth possible implementation of the fourth aspect, the switch circuit includes a seventh switch element, configured to enable the voltage converter to operate in a first operating mode, where in the first operating mode, the switch circuit is configured to switch on the first charging loop in the first time period, and switch off the first charging loop and switch on the first discharging loop and the second discharging loop in the second time period.

Optionally, the seventh switch element may be in an off state in both the first time period and the second time period.

With reference to the foregoing possible implementations of the fourth aspect, in a seventh possible implementation of the fourth aspect, the seventh switch element is further configured to switch the voltage converter to a second operating mode, where in the second operating mode, the first energy storage element is short-circuited, and the switch circuit is configured to switch on a second charging loop in a third time period and switch off the second charging loop and switch on the second discharging loop in a fourth time period following the third time period, where in the second charging loop, the voltage source charges the second energy storage element.

Optionally, in the third time period, the seventh switch element is in an on state, and the first switch element, the second switch element, and the third switch element are in an off state.

Optionally, in the fourth time period, the seventh switch element, the first switch element, and the second switch element are in an off state, and the third switch element is in an on state.

In this way, the voltage converter is switched between the first operating mode and the second operating mode by using the seventh switch element such that a range and flexibility of an application scenario of the voltage converter may be enlarged.

With reference to the foregoing possible implementations of the fourth aspect, in an eighth possible implementation of the fourth aspect, a first terminal of the seventh switch element is connected to the first external terminal of the voltage converter, and a second terminal of the seventh switch element is connected to the second terminal of the first energy storage element and the first terminal of the second energy storage element.

With reference to the foregoing possible implementations of the fourth aspect, in a ninth possible implementation of the fourth aspect, the voltage converter further includes a controller, configured to send a driving signal to the switch circuit to control a status of the switch circuit.

According to a fifth aspect, another method for controlling a voltage converter is provided. The method includes sending a first driving signal to a switch circuit, to enable the switch circuit to switch on a first charging loop in a first time period, where in the first charging loop, a voltage source coupled to the voltage converter charges a first energy storage element and a second energy storage element, and sending a second driving signal to the switch circuit, to enable the switch circuit to switch off the first charging loop and switch on a first discharging loop and a second discharging loop in a second time period following the first time period, where in the first discharging loop, the first energy storage element discharges and provides energy to a load, and in the second discharging loop, the second energy storage element discharges and provides energy to the load.

Optionally, the voltage converter may be the voltage converter according to the fourth aspect or any possible implementation of the fourth aspect.

In a first possible implementation of the fifth aspect, the switch circuit includes a first switch element, where the first switch element is connected in series in the first charging loop, the sending a first driving signal to the switch circuit includes sending the first driving signal to the first switch element, to enable the first switch element to be in an on state in the first time period, and the sending a second driving signal to the switch circuit includes sending the second driving signal to the first switch element, to enable the first switch element to be in an off state in the second time period.

With reference to the foregoing possible implementations of the fifth aspect, in a second possible implementation of the fifth aspect, the switch circuit includes a second switch element, where the second switch element is connected in series in the first discharging loop, the sending a first driving signal to the switch circuit includes sending the first driving signal to the second switch element, to enable the second switch element to be in an off state in the first time period, and the sending a second driving signal to the switch circuit includes sending the second driving signal to the second switch element, to enable the second switch element to be in an on state in the second time period.

With reference to the foregoing possible implementations of the fifth aspect, in a third possible implementation of the fifth aspect, the third switch element is connected in series in the second discharging loop, the sending a first driving signal to the switch circuit includes sending the first driving signal to the third switch element, to enable the third switch element to be in an off state in the first time period, and the sending a second driving signal to the switch circuit includes sending the second driving signal to the third switch element, to enable the third switch element to be in an on state in the second time period.

With reference to the foregoing possible implementations of the fifth aspect, in a fourth possible implementation of the fifth aspect, the switch circuit includes a seventh switch element, where before the first driving signal and the second driving signal are sent to the switch circuit, the method further includes sending a third driving signal to the seventh switch element, to enable the seventh switch element to switch the voltage converter to a first operating mode.

With reference to the foregoing possible implementations of the fifth aspect, in a fifth possible implementation of the fifth aspect, the method further includes sending a fourth driving signal to the seventh switch element, to enable the seventh switch element to switch the voltage converter to a second operating mode, where when the voltage converter is in the second operating mode, the first energy storage element is short-circuited.

With reference to the foregoing possible implementations of the fifth aspect, in a sixth possible implementation of the fifth aspect, the method further includes, when the voltage converter is in the second operating mode, sending a fifth driving signal to the switch circuit, to enable the switch circuit to switch on a second charging loop in a third time period, and sending a sixth driving signal to the switch circuit, to enable the switch circuit to switch off the second charging loop and switch on the second discharging loop in a fourth time period following the third time period, where in the second charging loop, the voltage source charges the second energy storage element.

According to a sixth aspect, another computer readable medium is provided, and is configured to store a computer program, where the computer program includes instructions for performing the method according to the fifth aspect or any possible implementation of the fifth aspect.

According to a seventh aspect, a voltage conversion system is provided. The voltage conversion system includes a voltage converter, and a voltage source and a load that are coupled to the voltage converter.

The voltage converter may be configured to convert an input voltage of the voltage source coupled to the voltage converter and then provide the converted input voltage to the load.

The voltage converter may be the voltage converter according to the first aspect or any possible implementation of the first aspect or may be the voltage converter according to the fourth aspect or any possible implementation of the fourth aspect.

BRIEF DESCRIPTION OF DRAWINGS

FIG. 7 is a schematic flowchart of a method for controlling a voltage converter according to an embodiment of this application.

DESCRIPTION OF EMBODIMENTS

The following describes the technical solutions of this application with reference to accompanying drawings.

It should be understood that, the embodiments of this application may be applied to a direct-current to direct-current voltage conversion scenario. In an embodiment, the embodiments of this application may be applied to a buck converter such as a buck circuit, or may be applied to a boost converter such as a boost circuit. This is not limited in the embodiments of this application.

Figure 1:
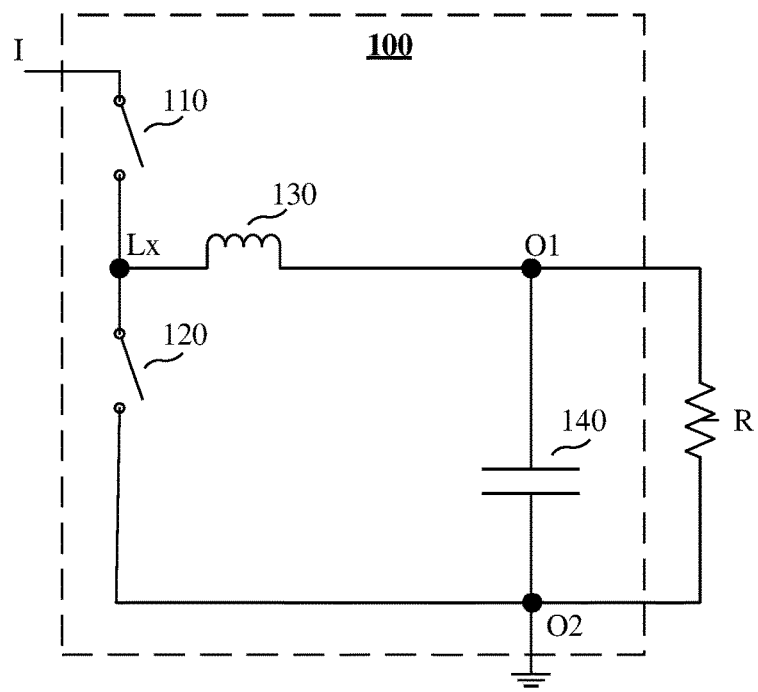
FIG. 1 is a schematic circuit diagram of a typical buck circuit.
Figure 2:
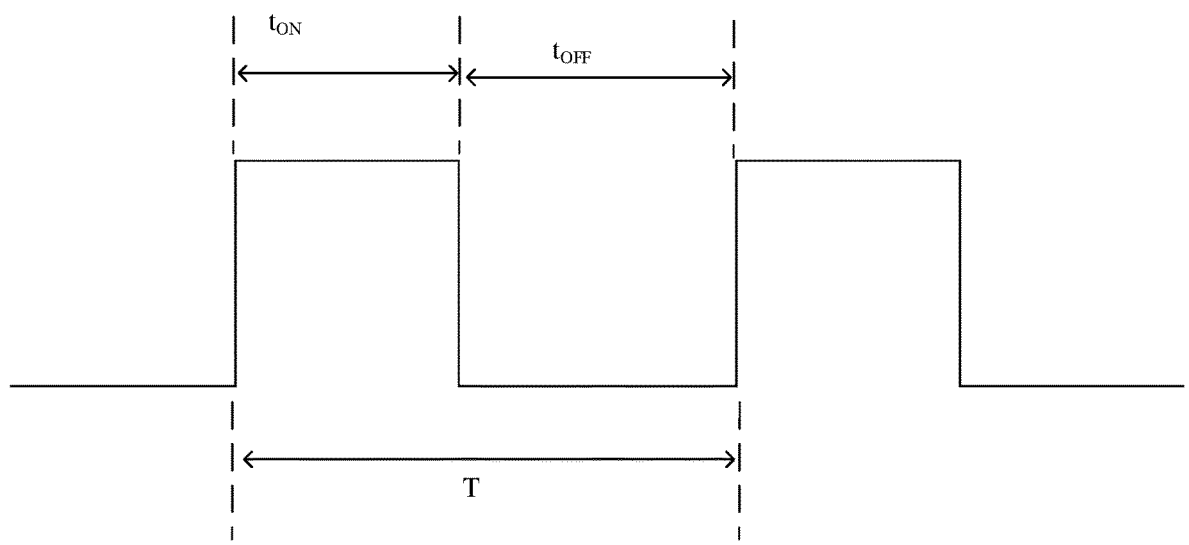
FIG. 2 is a schematic diagram of a control signal time sequence of the buck circuit shown in FIG. 1.

FIG. 1 shows a typical buck circuit 100 that may be configured to perform buck conversion on an input voltage and then provide an input voltage obtained through buck conversion to a load R. As shown in FIG. 1, the buck circuit 100 includes an input terminal I, a power tube switch 110, a power tube switch 110, an inductor 130, a capacitor 120, and output terminals O1 and O2, where the inductor 130 and the capacitor 120 form a filter circuit. In an embodiment, one end of the power tube switch 110 is connected to the input terminal I of the buck circuit 100, the other end of the power tube switch 110 is connected to an endpoint Lx, the endpoint Lx is further connected to one end of the inductor 130 and one end of the power tube switch 110, the other end of the inductor 130 is connected to one end of the capacitor 120, and the other end of the power tube switch 110 is connected to the other end of the capacitor 120. As shown in FIG. 2, a control signal period T of the buck circuit 100 includes two time periods tON and tOFF, where in the time period tON, the power tube switch 110 is in a closed state, and the power tube switch 110 is in an off state. In this case, the input voltage Vin is connected to the inductor 130 by using the endpoint LX, and the inductor 130 is in a charging and energy storage state. In the time period tOFF, the power tube switch 110 is in an off state, the power tube switch 110 is in a closed state, the endpoint LX is grounded by using the power tube switch 110, and the inductor 130 is in a discharging state.

When the buck circuit 100 reaches a steady state, the following formulas are satisfied:

$$V_{out}=V_{in} \times D_2 \quad (1)$$

$$I_L=I_{out} \quad (2)$$

where Vout is a voltage between the output terminals O1 and O2, that is, a voltage provided by the buck circuit 100 to the load, Vin is an input voltage, that is, a voltage of the input terminal I relative to ground, D2 is a duty cycle that is equal to a ratio of tON to T, IL is an inductance current, and Iout is a load current.

Currently, key restraint factors of energy conversion efficiency of the buck circuit include a loss of an inductive winding DCR that is equal to DCR×IL2, and a loss of a parasitic capacitor Cp at the endpoint LX that is equal to Cp×ViM2/2. An embodiment of the present disclosure provides a voltage converter, to reduce a circuit loss, and improve energy conversion efficiency.

Figure 3:
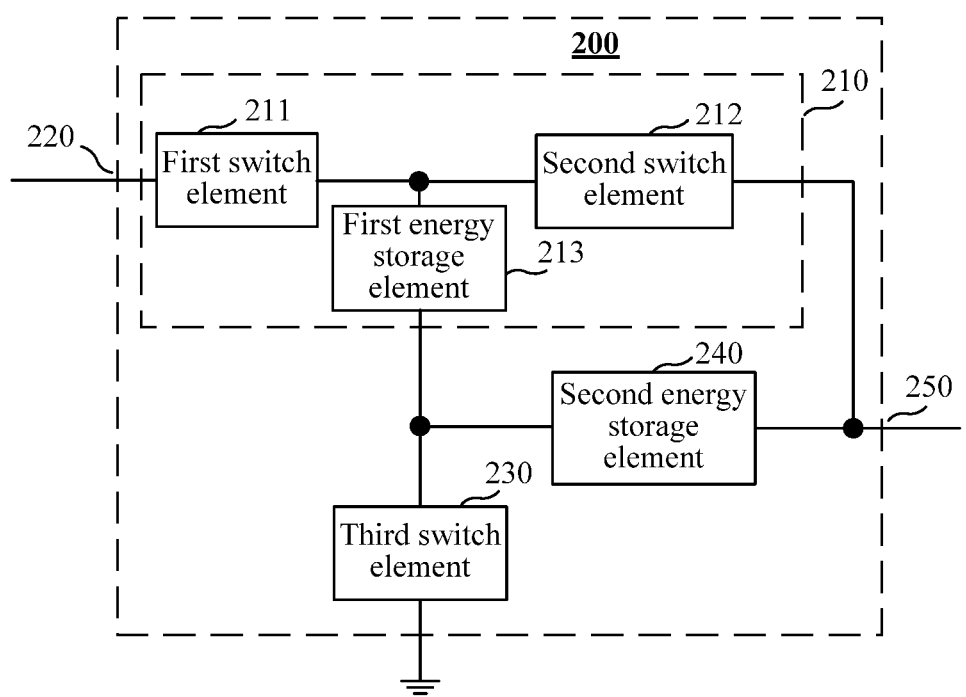
FIG. 3 is a schematic diagram of a voltage converter according to an embodiment of this application.

FIG. 3 shows a voltage converter 200 according to an embodiment of this application. The voltage converter 200 may be configured to perform boost or buck conversion on an input voltage provided by a voltage source coupled to the voltage converter 200 and then provide an input voltage obtained through boost or buck conversion to a load coupled to the voltage converter 200. Optionally, the load may be a terminal device, and this is not limited in this embodiment of this application.

As shown in FIG. 3, the voltage converter 200 may include an energy storage circuit 210, and the energy storage circuit 210 includes a first switch element 211, a second switch element 212, and a first energy storage element 213.

The voltage converter 200 further includes a first external terminal 220, a third switch element 230, a second energy storage element 240, and a second external terminal 250.

A first terminal of the first switch element 211 is coupled to the first external terminal 220, a second terminal of the first switch element 211 is coupled to a first terminal of the first energy storage element 213 and a first terminal of the second switch element 212, a second terminal of the second switch element 212 is coupled to the second external terminal 250, a second terminal of the first energy storage element 213 is coupled to a first terminal of the third switch element 230 and a first terminal of the second energy storage element 240, a second terminal of the second energy storage element 240 is coupled to the second external terminal 250, and a second terminal of the third switch element 230 is grounded.

In a first time period, the first switch element 211 is in an on state, the second switch element 212 and the third switch element 230 are in an off state, and a voltage source coupled to the voltage converter 200 charges the first energy storage element 213 and the second energy storage element 240.

In a second time period following the first time period, the first switch element 211 is in an off state, the second switch element 212 and the third switch element 230 are in an on state, the first energy storage element 213 and the second energy storage element 240 separately discharge to a load coupled to the voltage converter 200.

The voltage converter 200 may include the first external terminal 220 and the second external terminal 250, where one of the first external terminal 220 and the second external terminal 250 may be configured to connect to the voltage source, and the other may be configured to connect to the load.

In an optional embodiment, the first external terminal 220 may be configured to connect to the load, and the second external terminal 250 may be configured to connect to the voltage source. In this case, optionally, the voltage converter 200 may be configured to perform boost conversion on an input voltage provided by the voltage source and then provide an input voltage obtained through boost conversion to the load, that is, the voltage converter 200 is a boost converter. In another optional embodiment, the first external terminal 220 is configured to connect to the voltage source, and the second external terminal 250 is configured to connect to the load. In this case, optionally, the voltage converter 200 may be configured to perform buck conversion on an input voltage provided by the voltage source and then provide an input voltage obtained through buck conversion to the load, that is, the voltage converter 200 is a buck converter. This is not limited in this embodiment of this application.

Optionally, the first energy storage element 213 and the second energy storage element 240 may each be an element that can store energy and can release the stored energy, for example, a capacitor or an inductor. Optionally, the first energy storage element 213 and the second energy storage element 240 may be of different device types. In an optional embodiment, the first energy storage element 213 is a capacitor, the second energy storage element 240 is an inductor, and this is not limited in this embodiment of this application.

Optionally, the voltage converter 200 may include one or more first energy storage elements 213, and the voltage converter 200 may include one or more second energy storage elements 240. This is not limited in this embodiment of this application. FIG. 3 shows an example in which the voltage converter 200 includes one first energy storage element 213 and one second energy storage element 240. This embodiment of this application is not limited thereto.

In the voltage converter 200, a conversion period (referred to as a first conversion period hereinafter) may include a first time period and a second time period, where the second time period may be after the first time period, and a length of the second time period may be equal to or not equal to a length of the first time period. The length of the first time period and the length of the second time period are not limited in this embodiment of this application.

In another optional embodiment, the voltage converter 200 may further include a capacitor CL, where one end of the capacitor may be connected to the second external terminal 250 of the voltage converter 200, and the other end of the capacitor may be grounded. If the second energy storage element is an inductor, the capacitor CL and the second energy storage element may form a filter circuit. This embodiment of this application is not limited thereto.

Optionally, in the first time period, the first switch element 211 may be in an on state, and both the second switch element 212 and the third switch element 230 may be in an off state such that a first charging loop formed by sequentially connecting the voltage source, the first switch element 211, the first energy storage element 213, the second energy storage element 240, and the load in series is in an on state, and the first energy storage element 213 and the second energy storage element 240 are charged and store energy.

Optionally, in the second time period, the first switch element 211 may be in an off state, and the second switch element 212 and the third switch element 230 may be in an on state such that the foregoing first charging loop is in an off state, a first discharging loop formed by sequentially connecting the first energy storage element 213, the second switch element 212, the load, and the third switch element 230 in series is in an on state, a second discharging loop formed by sequentially connecting the second energy storage element 240, the load, and the third switch element 230 in series is in an on state, and the first energy storage element 213 and the second energy storage element 240 discharge and release energy. This embodiment of this application is not limited thereto.

In this embodiment of this application, the first energy storage element may release stored energy to the load by using the first discharging loop. Optionally, an energy storage element in the first discharging loop may be the first energy storage element, that is, the first discharging loop may not include an energy storage element other than the first energy storage element. The second energy storage element may release stored energy to the load by using the second discharging loop. Optionally, the first energy storage element and the second energy storage element may be connected in parallel in the second time period. This embodiment of this application is not limited thereto.

In another optional embodiment, the voltage converter 200 may include a switch circuit, a first energy storage element, and a second energy storage element.

In an embodiment, the switch circuit may be configured to switch on the first charging loop in the first time period. Optionally, in the first charging loop, the voltage source provides energy to the first energy storage element, the second energy storage element, and the load. In this case, both the first energy storage element and the second energy storage element may be in a charging and energy storage state. Optionally, in the first time period, the voltage source may be connected to the first energy storage element, the second energy storage element, and the load in series. This embodiment of this application is not limited thereto.

The switch circuit may be further configured to switch off the first charging loop in the second time period, and switch on the first discharging loop and the second discharging loop, where in the first discharging loop, the first energy storage element provides energy to the load, and in the second discharging loop, the second energy storage element provides energy to the load. In this case, both the first energy storage element and the second energy storage element may be in a discharging and energy release state.

The switch circuit may include one or more switch elements. Optionally, the switch circuit may include a first switch element, where the first switch element is connected in series in the first charging loop.

In an embodiment, in the first charging loop, the first switch element may be connected to the first energy storage element, the second energy storage element, and the load in series, and a connection order between the first switch element, the first energy storage element, the second energy storage element, and the load is not limited in this embodiment of this application.

The first switch element may be configured to switch on or switch off the first charging loop. Optionally, the first switch element may switch on the first charging loop in the first time period, and switch off the first charging loop in the second time period. For example, the first switch element may be in an on state or in a closed state in the first time period, and be in an off state in the second time period. This embodiment of this application is not limited thereto.

In an optional embodiment, in the voltage converter 200, a first terminal of the first switch element may be connected to the first external terminal, and a second terminal of the first switch element may be connected to a first terminal of the first energy storage element. Optionally, the second terminal of the first energy storage element may be connected to a first terminal of the second energy storage element, and a second terminal of the second energy storage element may be connected to the second external terminal. This embodiment of this application is not limited thereto.

Optionally, the switch circuit may include a second switch element, where the second switch element may be connected in series in the first discharging loop.

In an embodiment, in the first discharging loop, the second switch element may be connected to the first energy storage element and the load in series, but a connection order between the second switch element, the first energy storage element, and the load is not limited in this embodiment of this application.

Optionally, the second switch element may be configured to switch on or switch off the first discharging loop. Optionally, the second switch element may switch off the first discharging loop in the first time period, and switch on the first discharging loop in the second time period. For example, the second switch element may be in an off state in the first time period, and be in an on state or in a closed state in the second time period. This embodiment of this application is not limited thereto.

In an optional embodiment, in the voltage converter 200, a first terminal of the second switch element may be connected to the first terminal of the first energy storage element, and a second terminal of the second switch element may be connected to the second external terminal of the voltage converter 200. In this case, optionally, the first terminal of the first energy storage element may be connected to the second terminal of the first switch element and the first terminal of the second switch element. This embodiment of this application is not limited thereto.

Optionally, the switch circuit may include a third switch element, where the third switch element may be connected in series in the second discharging loop.

In an embodiment, in the second discharging loop, the third switch element may be connected to the second energy storage element and the load in series, but a connection order between the third switch element, the second energy storage element, and the load is not limited in this embodiment of this application.

Optionally, the third switch element may be configured to switch on or switch off the second discharging loop. Optionally, the third switch element may switch off the second discharging loop in the first time period, and switch on the second discharging loop in the second time period. For example, the third switch element may be in an off state in the first time period, and be in an on state or in a closed state in the second time period. This embodiment of this application is not limited thereto.

Optionally, the third switch element may be connected in series in both the first discharging loop and the second discharging loop.

In an optional embodiment, in the voltage converter 200, a first terminal of the third switch element may be connected to the second terminal of the first energy storage element, and a second terminal of the third switch element may be grounded. In this case, optionally, the second terminal of the first energy storage element may be separately connected to the first terminal of the second energy storage element and the first terminal of the third switch element. This embodiment of this application is not limited thereto.

Figure 4:
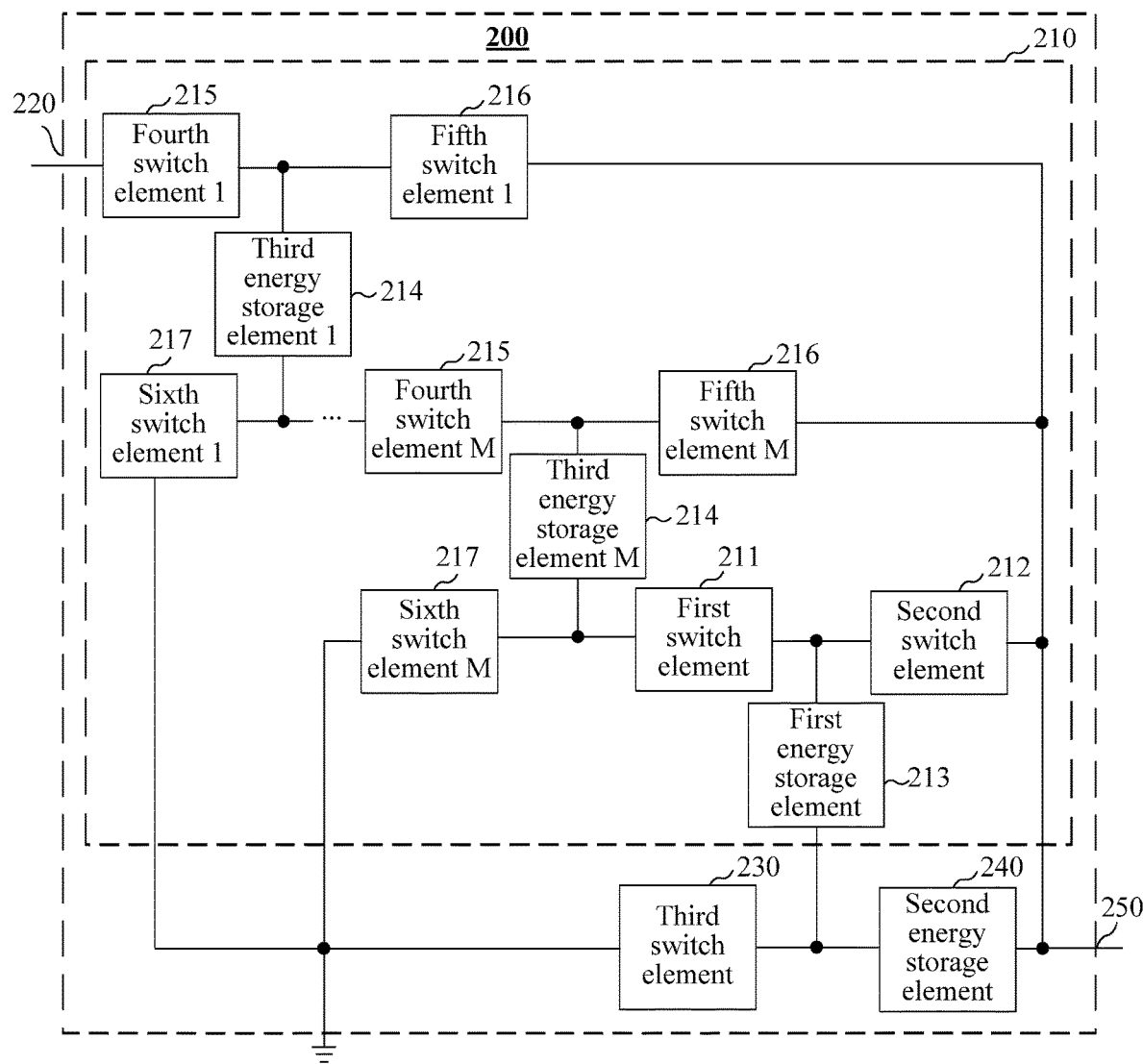
FIG. 4 is another schematic diagram of a voltage converter according to an embodiment of this application.

In another optional embodiment, as shown in FIG. 4, the energy storage circuit 210 may further include M third energy storage elements 214 (a third energy storage element 1, . . . , and a third energy storage element M), M fourth switch elements 215 (a fourth switch element 1, . . . , and a fourth switch element M), M fifth switch elements 216 (a fifth switch element 1, . . . , and a fifth switch element M), and M sixth switch elements 217 (a sixth switch element 1, . . . , and a sixth switch element M), where M is an integer greater than or equal to 1.

Optionally, the third energy storage element 214 may be a device different from the first energy storage element 213 and the second energy storage element 240, or the third energy storage element 214 may be a device that is the same as the first energy storage element 213 or the second energy storage element 240. In an optional embodiment, the third energy storage element 214 may be a capacitor. This embodiment of this application is not limited thereto.

Optionally, a first terminal of the fourth switch element 1 may be coupled to a first terminal of the energy storage circuit 210, that is, the first terminal of the fourth switch element 1 may be coupled to the first external terminal, and a second terminal of the fourth switch element 1 may be connected to a first terminal of the third energy storage element 1 and a first terminal of the fifth switch element 1. A second terminal of the fifth switch element 1 may be connected to the second external terminal. A second terminal of the third energy storage element 1 may be connected to a first terminal of the fourth switch element 2 and a first terminal of the sixth switch element 1.

When i is an integer greater than or equal to 2 and less than or equal to M, a first terminal of the fourth switch element i may be connected to a second terminal of the third energy storage element i−1, and a second terminal of the fourth switch element i may be connected to a first terminal of the third energy storage element i and a first terminal of the fifth switch element i. A second terminal of the fifth switch element i may be connected to the second external terminal. A second terminal of the third energy storage element i may be connected to a first terminal of the sixth switch element i. A second terminal of the sixth switch element may be grounded. If the second terminal of the third energy storage element i may be further connected to a first terminal of the first switch element 211.

Optionally, some or all of the M third energy storage elements 214 may be in a charging and energy storage state in the first time period, and in a discharging and energy release state in the second time period. This embodiment of this application is not limited thereto.

Optionally, the M fourth switch elements may be connected in series in the first charging loop. The M fourth switch elements may be configured to switch on or switch off the first charging loop. In an optional embodiment, in the first time period, all of the M fourth switch elements may be in an on state such that the first charging loop is in an on state. In the second time period, all of the M fourth switch elements may be in an off state such that the first charging loop is in an off state. This embodiment of this application is not limited thereto.

Optionally, in the first charging loop, the voltage source may be further configured to charge all of the M third energy storage elements. Optionally, in the first charging loop, the M third energy storage elements 214 may be connected in series. In addition, the M third energy storage elements 214 may be further connected to the first external terminal of the voltage converter, the M fourth switch elements, the first switch element 211, the first energy storage element 213, the second energy storage element 240, and the load in series.

Optionally, in the second time period, each third energy storage element 214 in a discharging state may correspond to a discharging loop that is referred to as a third discharging loop below. In an optional embodiment, in the second time period, there may be M third discharging loops, the M third discharging loops may be in a one-to-one correspondence with the M third energy storage elements, and in each third discharging loop, a corresponding third energy storage element may release stored energy to the load. This embodiment of this application is not limited thereto.

Optionally, the M fifth switch elements 214 may be in a one-to-one correspondence with the M third energy storage elements 214, where each fifth switch element 214 may be configured to switch on or switch off a third discharging loop including a corresponding third energy storage element 214. In the third discharging loop, the fifth switch element 214 may be connected in series to the corresponding third energy storage element 214. In an optional embodiment, each fifth switch element 214 may be configured to switch off, in the first time period, the third discharging loop including the corresponding third energy storage element 214, and switch on, in the second time period, the third discharging loop including the corresponding third energy storage element 214. For example, each fifth switch element may be in an off state in the first time period, and be in an on state in the second time period. This embodiment of this application is not limited thereto.

Optionally, the M sixth switch elements may be in a one-to-one correspondence with the M third energy storage elements 214, and each sixth switch element may be configured to switch on or switch off a third discharging loop including a corresponding third energy storage element 214. In the third discharging loop, the sixth switch element may be connected in series to the corresponding third energy storage element 214. In an optional embodiment, the sixth switch element may be configured to switch off, in the first time period, the third discharging loop including the corresponding third energy storage element 214, and switch on, in the second time period, the third discharging loop including the corresponding third energy storage element 214. For example, each sixth switch element may be in an off state in the first time period, and be in an on state in the second time period. This embodiment of this application is not limited thereto.

In an optional embodiment, in the second time period, the third discharging loop formed by connecting the third energy storage element i, the fifth switch element i, the sixth switch element i, and the load in series is switched on, and the third energy storage element i provides energy to the load. This embodiment of this application is not limited thereto.

It should be understood that, in an example shown in FIG. 4, the energy storage circuit 210 includes the M fourth switch elements, the M fifth switch elements, and the M sixth switch elements. However, quantities of fourth switch elements, fifth switch elements, and sixth switch elements included in the energy storage circuit 210 are not limited in this embodiment of this application.

In another optional embodiment, the voltage converter 200 may further include a seventh switch element 260, and the seventh switch element 260 may be configured to enable an energy storage element (for example, the first energy storage element 213, or the first energy storage element 213 and M third energy storage elements 214) in the energy storage circuit 210 to be in an operating state or a bypass state. Optionally, when the energy storage element in the energy storage circuit 210 is in an operating state, the voltage converter 200 may operate in a first operating mode. For an operating principle of the voltage converter 200 in the first operating mode, refer to the foregoing description for the voltage converter 200. Optionally, when the energy storage element in the energy storage circuit 210 is in a bypass state, the voltage converter 200 may operate in a second operating mode.

If the voltage converter 200 is in the second operating mode, a second charging loop may be in an on state in a third time period, where in the second charging loop, the voltage source provides energy to the second energy storage element 240 and the load, and the second energy storage element is charged and stores energy. In this case, the second charging loop may not include the energy storage element in the energy storage circuit 210. Optionally, in a fourth time period following the third time period, the second charging loop may be in an off state, the second discharging loop may be in an on state, and the second energy storage element 240 provides energy to the load. This embodiment of this application is not limited thereto.

Optionally, in the second operating mode, the voltage converter 200 may have a second conversion period, and the second conversion period may include the third time period and the fourth time period following the third time period. Optionally, the second conversion period may be the same as or different from the first conversion period, a length of the first time period may be the same as or different from that of the third time period, and a length of the second time period may be the same as or different from that of the fourth time period. This is not limited in this embodiment of this application.

Figure 5:
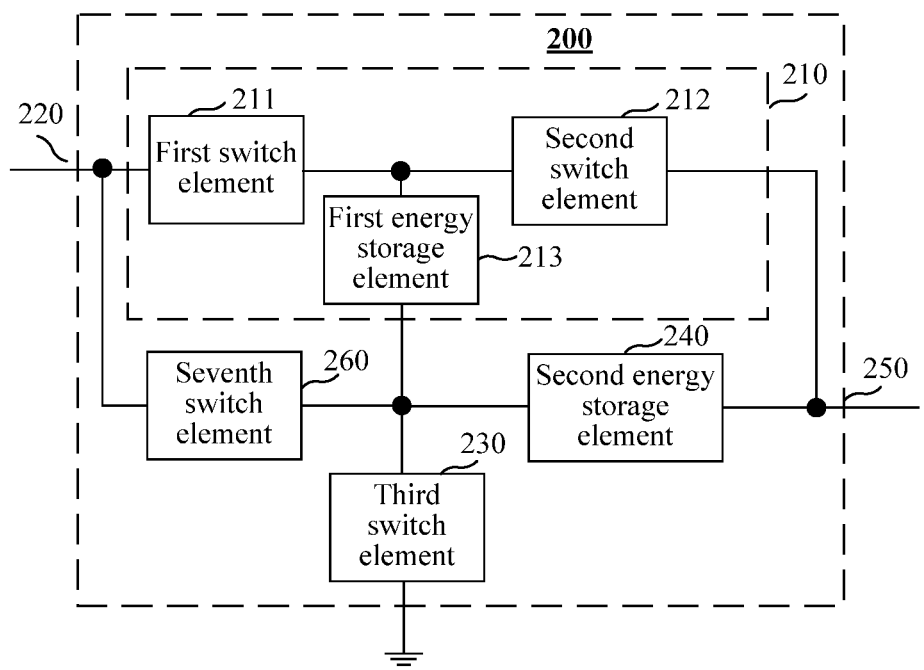
FIG. 5 is another schematic diagram of a voltage converter according to an embodiment of this application.

In an optional embodiment, as shown in FIG. 5, a first terminal of the seventh switch element 260 may be connected to the first external terminal, and a second terminal of the seventh switch element 260 may be connected to the second terminal of the first energy storage element 213, the first terminal of the second energy storage element 240, and the first terminal of the third switch element 230. This embodiment of this application is not limited thereto.

Optionally, in the second operating mode, the first switch element 211 and the second switch element 212 may always keep an off state.

In the third time period, the seventh switch element 260 may be in an on state, and the third switch element 230 may be in an off state such that the second charging loop formed by sequentially connecting the voltage source, the seventh switch element 260, the second energy storage element 240, and the load in series is in an on state, and the second energy storage element 240 is charged and stores energy.

In the fourth time period, the seventh switch element 260 may be in an off state, and the third switch element 230 may be in an on state such that the second charging loop is in an off state, the second discharging loop formed by the second energy storage element 240, the load, and the third switch element 230 is in an on state, and the second energy storage element 240 discharges and releases energy. This embodiment of this application is not limited thereto.

When the voltage converter 200 reaches a steady state in the second operating mode, the foregoing formulas (1) and (2) may be satisfied. This embodiment of this application is not limited thereto.

Optionally, a switch element in this embodiment of this application may be a device such as a semiconductor MOSFET transistor, a semiconductor rectifier, or a semiconductor diode. This is not limited in this embodiment of this application.

In another optional embodiment, the voltage converter 200 may further include a controller, configured to send a driving signal to each switch element in the voltage converter 200 to control a status of the switch element. Optionally, the controller may be a control circuit or a control chip. This is not limited in this embodiment of this application.

Figure 6:
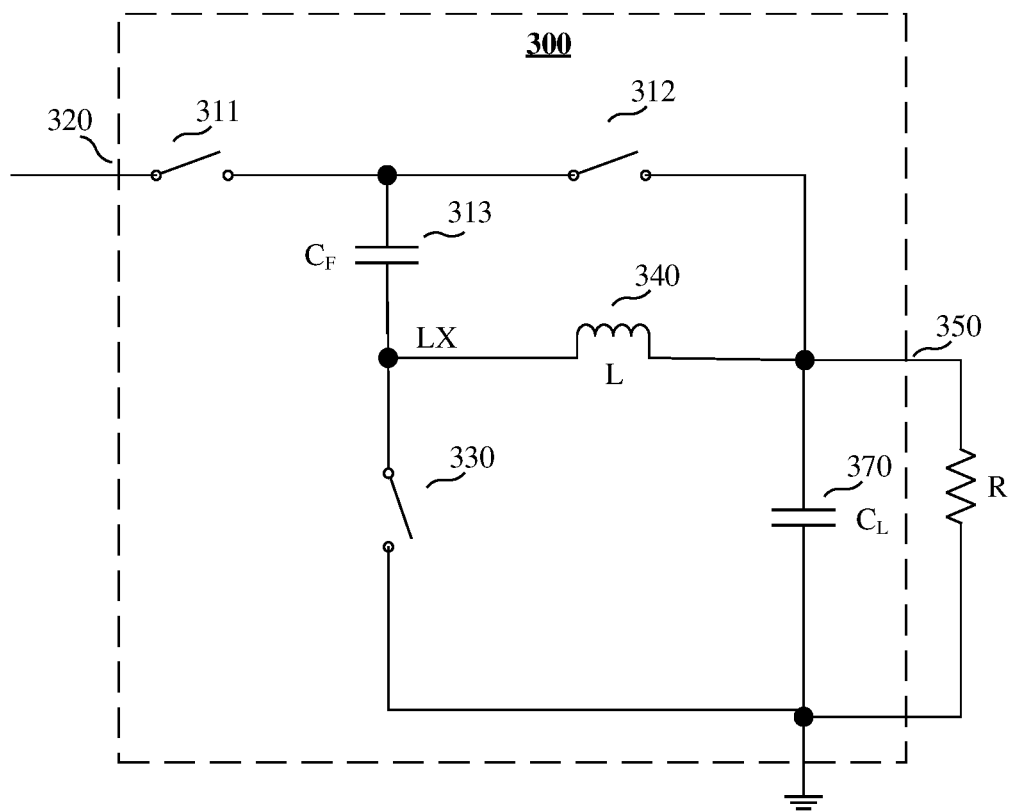
FIG. 6 is a schematic diagram of a circuit structure example of a voltage converter according to an embodiment of this application.

FIG. 6 shows an example of a voltage converter 300 according to an embodiment of this application. It is assumed herein that the voltage converter 300 is a buck converter. As shown in FIG. 6, the voltage converter 300 includes a first external terminal 320 configured to connect to a voltage source, a power tube switch 311, a power tube switch 312, a capacitor 313, a power tube switch 330, an inductor 340, a capacitor 370, and a second external terminal 350 configured to connect to a load, where the inductor 340 and the capacitor 370 form a filter circuit.

In an embodiment, in the voltage converter 300, the first energy storage element is a capacitor CF, the second energy storage element is an inductor L, and each switch element is a power tube switch.

Optionally, in a first time period, the power tube switch 311 may be in an on state, and the power tube switch 312 and the power tube switch 330 may be in an off state such that a first charging loop formed by connecting the voltage source coupled to the first external terminal, the power tube switch 311, the capacitor 313, the inductor 340, and the load R coupled to the second external terminal in series is in an on state, and both the capacitor 313 and the inductor 340 are in a charging and energy storage state. Optionally, in a second time period, the power tube switch 311 may be in an off state, and the power tube switch 312 and the power tube switch 330 are in an on state such that the first charging loop is in an off state, a first discharging loop formed by connecting the capacitor 313, the power tube switch 312, the load R, and the power tube switch 330 in series is in an on state, the capacitor 313 releases stored energy by using the first discharging loop, a second discharging loop formed by connecting the inductor 340, the load R, and the power tube switch 330 in series is in an on state, and the inductor 340 releases stored energy by using the second discharging loop.

In addition, FIG. 6 shows an example in which the voltage converter 300 includes a capacitor CF. Optionally, the voltage converter 300 may include N capacitors CF, each of the N capacitors C may be in a charging state in the first time period, corresponds to a discharging loop in the second time period, and releases stored energy to the load by using the corresponding discharging loop. Optionally, N may be equal to M+1, that is, each of the foregoing M third energy storage elements may be a capacitor CF. In this way, when a circuit of the voltage converter 300 reaches a steady state, the following relationships may be satisfied:

$$V_{out} = \frac{V_{in} \times D_1}{1 + N \times D_1} \quad (3)$$

$$I_L = \frac{I_{out}}{1 + N \times D_1} = I_{out} \times \frac{V_{in} - N \times V_{out}}{V_{in}} \quad (4)$$

where Vout is a voltage of the output load, that is, an output voltage of the voltage converter, Vin is the voltage source, that is, an input voltage provided by the voltage source to the voltage converter, D1 is a duty cycle that is equal to a ratio of the first time period to a first conversion period, IL is an inductance current, and Iout is an output current.

It can be learned based on the formula (3) that, compared with the typical buck circuit shown in FIG. 1, after the circuit of the voltage converter provided in this embodiment of this application reaches a steady state, the inductance current is reduced to $(V_{in}-N*V_{out})/V_{in}$ of the output current Iout. In this way, a loss of an inductive winding DCR is reduced to $DCR \times [(V_{in}-N*V_{out})/V_{in}]^2$. In addition, in the voltage converter provided in this embodiment of this application, a voltage swing at an endpoint LX is reduced to $V_{in}-V_{out}$. Then a loss of a parasitic capacitor at the endpoint LX is reduced to $0.5*C_p*(V_{in}-V_{out})^2$. In this way, compared with the typical buck circuit shown in FIG. 1, energy conversion efficiency of the voltage converter provided in this embodiment of this application is effectively improved by reducing a circuit loss.

An embodiment of this application further provides a voltage conversion system. The voltage conversion system may include any voltage converter described above, and a voltage source and a load that are coupled to the voltage converter. For a specific structure and an operating principle, refer to the foregoing description. For brevity, details are not described herein again.

The voltage converters provided in the embodiments of this application are described in detail above with reference to FIG. 2 to FIG. 6, and a method for controlling a voltage converter provided in an embodiment of this application is described in detail below with reference to FIG. 7.

FIG. 7 shows a method 400 for controlling a voltage converter according to an embodiment of this application. Optionally, the voltage converter may be any voltage converter 200 described above, and this is not limited in this embodiment of this application. The method 400 includes the following steps.

S410: Send a first driving signal to a first switch element, and send a second driving signal to a second switch element and a third switch element such that a voltage source coupled to a voltage converter charges a first energy storage element and a second energy storage element in a first time period, where the first driving signal is used to control the first switch element to be in an on state in the first time period, and the second driving signal sent to the second switch element and the third switch element is used to control the second switch element and the third switch element to be in an off state in the first time period.

S420: Send a third driving signal to the first switch element, and send a fourth driving signal to the second switch element and the third switch element such that the first energy storage element and the second energy storage element separately discharge, in a second time period following the first time period, to a load coupled to the voltage converter, where the third driving signal is used to control the first switch element to be in an off state in the second time period, and the fourth driving signal sent to the second switch element and the third switch element is used to control the second switch element and the third switch element to be in an on state in the second time period.

Optionally, in S410 and S420, a controller may send driving signals to switch elements simultaneously or in any order. In addition, S410 and S420 may be performed simultaneously or S410 may be performed before S420. This is not limited in this embodiment of this application.

Optionally, the first driving signal and the second driving signal may be a same signal or different signals, and the third driving signal and the fourth driving signal may be a same signal or different signals. This is not limited in this embodiment of this application.

Optionally, the method 400 further includes sending, by the controller, a fifth control signal to the seventh switch element, where the fifth control signal is used to control the seventh switch element to be in an off state in both the first time period and the second time period.

Optionally, the method 400 further includes sending, by the controller, a sixth control signal to the seventh switch element, and sending seventh switching signals to the first switch element, the second switch element, and the third switch element such that the voltage source charges the second energy storage element in a third time period, where the sixth control signal is used to control the seventh switch element to be in an on state in the third time period, and the seventh switching signals sent to the first switch element, the second switch element, and the third switch element are respectively used to control the first switch element, the second switch element, and the third switch element to be in an off state in the third time period, and sending, by the controller, eighth control signals to the seventh switch element, the first switch element, and the second switch element, and sending a ninth control signal to the third switch element such that the second energy storage element discharges to the load in a fourth time period following the third time period, where the eighth control signals sent to the seventh switch element, the first switch element, and the second switch element are respectively used to control the seventh switch element, the first switch element, and the second switch element to be in an off state in the fourth time period, and the ninth control signal is used to control the third switch element to be in an on state in the fourth time period.

In another optional embodiment, the control method 400 includes sending a first driving signal to a switch circuit in the voltage converter, to enable the switch circuit to switch on a first charging loop in the first time period, where in the first charging loop, the voltage source coupled to the voltage converter provides energy to the first energy storage element, the second energy storage element, and the load, and sending a second driving signal to the switch circuit, to enable the switch circuit to switch off the first charging loop and switch on a first discharging loop and a second discharging loop in the second time period following the first time period, where in the first discharging loop, the first energy storage element provides energy to the load, and in the second discharging loop, the second energy storage element provides energy to the load.

Optionally, the first driving signal and the second driving signal may be respectively sent in the first time period and the second time period, or may be sent simultaneously or sent in any order. This is not limited in this embodiment of this application.

Optionally, the first driving signal may be used to control the first switch element to be in an on state in the first time period, and the second driving signal may be used to control the first switch element to be in an off state in the second time period. This embodiment of this application is not limited thereto.

Optionally, the first driving signal may be used to control the second switch element to be in an off state in the first time period, and the second driving signal may be used to control the second switch element to be in an on state in the second time period. This embodiment of this application is not limited thereto.

Optionally, the first driving signal may be used to control the third switch element to be in an off state in the first time period, and the second driving signal may be used to control the third switch element to be in an on state in the second time period. This embodiment of this application is not limited thereto.

Optionally, before the first driving signal and the second driving signal are sent to the switch circuit, the method 400 may further include sending the third driving signal to the seventh switch element, to enable the seventh switch element to be in an off state.

Optionally, the method 400 may further include sending the fourth driving signal to the seventh switch element, to enable the seventh switch element to bypass the first energy storage element.

Optionally, the method may further include sending a fifth driving signal to the switch circuit, to enable the switch circuit to switch on a second charging loop in a third time period, and sending a sixth driving signal to the switch circuit, to enable the switch circuit to switch off the second charging loop and switch on the second discharging loop in a fourth time period following the third time period, where in the second charging loop, the voltage source provides energy to the second energy storage element and the load.

In an optional example, a person skilled in the art may understand that the method 400 may be performed by the controller in the foregoing embodiment. To avoid repetition, details are not described herein again.

It should be understood that, sequence numbers of the foregoing processes do not indicate an execution sequence, and an execution sequence of processes shall be determined based on functions and internal logic of the processes, and shall constitute no limitation on an implementation process of the embodiments of this application.

It should be further understood that, in the embodiments of this application, a same element corresponds to a similar tag in an accompanying drawing. In addition, the foregoing descriptions for the embodiments of this application emphasize a difference between the embodiments. For same or similar parts that are not mentioned, refer to each other. For brevity, details are not described herein again.

It should be further understood that, in this specification, that A is connected to B may indicate that A is directly connected to B or that A is indirectly connected to B. For example, A is connected to B by using one or more elements. This is not limited in the embodiments of this application.

In addition, terms "system" and "network" in this specification are usually interchangeably used in this specification. The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A voltage converter, comprising:
    a third switch comprising:
        a first terminal; and
        a second terminal, wherein the second terminal of the third switch is grounded;
    a second energy storage comprising:
        a first terminal; and
        a second terminal coupled to a second external terminal of the voltage converter; and
    an energy storage circuit comprising:
        a first switch comprising:
            a first terminal coupled to a first external terminal of the voltage converter; and
            a second terminal;
        a second switch comprising:
            a first terminal coupled to the second terminal of the first switch; and
            a second terminal coupled to the second external terminal of the voltage converter;
        a first energy storage comprising:
            a first terminal coupled to the second terminal of the first switch; and
            a second terminal coupled to the first terminal of the third switch and the first terminal of the second energy storage; and
        a controller; configured to:
            during a first time period,
                control the first switch to be in an on state; and
                control the second switch and the third switch to be in an off state; and
            during a second time period,
                control the first switch to be in an off state, and
                control the second switch and the third switch to be in an on state, wherein the second time period is after the first time period.

2. The voltage converter according to claim 1, wherein the energy storage circuit further comprises: M third energy storages; M fourth switches, wherein a first terminal of a fourth switch of the M fourth switches is coupled to the first external terminal; M fifth switches, wherein a first terminal of a third energy storage i of the M third energy storages is coupled to a second terminal of a fourth switch i of the M fourth switches and a first terminal of a fifth switch i of the M fifth switches, wherein i is a natural number and 1<i<M, and wherein a second terminal of the fifth switch i is coupled to the second external terminal; and M sixth switches, wherein a second terminal of a sixth switch i is grounded, wherein M is a positive integer, wherein i is less than M, and wherein a second terminal of the third energy storage i is coupled to a first terminal of the sixth switch i and a first terminal of a fourth switch i+1 of the M fourth switches.

3. The voltage converter according to claim 2,
    wherein during the first time period, all of the M fourth switches are in an on state while all of the M fifth switches and the M sixth switches are in an off state, and
    wherein during the second time period, the M fourth switches are in an off state while all of the M fifth switches and the M sixth switches are in an on state.

4. The voltage converter according to claim 1, wherein the energy storage circuit further comprises: M third energy storages; M fourth switches, wherein a first terminal of a fourth switch i of the M fourth switches is coupled to the first external terminal; M fifth switches, wherein a first terminal of a third energy storage i of the M third energy storages is coupled to a second terminal of a fourth switch i of the M fourth switches and a first terminal of a fifth switch i of the M fifth switches, wherein i is a natural number and 1<i<M, and wherein a second terminal of the fifth switch i is coupled to the second external terminal; and M sixth switches, wherein a second terminal of a sixth switch i is grounded, wherein M is a positive integer, wherein i is equal to M, and wherein a second terminal of the third energy storage i is coupled to a first terminal of the sixth switch i and the first terminal of the first switch.

5. The voltage converter according to claim 1, wherein the voltage converter further comprises a seventh switch, and wherein the seventh switch comprises:
    a first terminal coupled to the first external terminal; and
    a second terminal coupled to the first terminal of the third switch and the first terminal of the second energy storage, wherein the seventh switch is in an off state during both the first time period and the second time period.

6. The voltage converter according to claim 5, wherein during a third time period, the seventh switch is configured to be in an on state, the first switch, the second switch, and the third switch are configured to be in an off state, and wherein during a fourth time period following the third time period, the seventh switch, the first switch, and the second switch are configured to be in an off state while the third switch is configured to be in an on state.

7. The voltage converter according to claim 1, wherein the first energy storage is a capacitor, and the second energy storage is an inductor.

8. The voltage converter according to claim 1, wherein a voltage source is coupled to the voltage converter using the first external terminal and load is coupled to the voltage converter using the second external terminal, and wherein an input voltage provided by the voltage source to the voltage converter is greater than a voltage between two ends of the load.

9. The voltage converter according to claim 1, wherein a load is coupled to the voltage converter using the first external terminal and a voltage source is coupled to the voltage converter using the second external terminal, and wherein an input voltage provided by the voltage source to the voltage converter is less than a voltage between two ends of the load.

10. The voltage converter according to claim 1, wherein a voltage source is coupled to the voltage converter using the first external terminal and a load is coupled to the voltage converter using the second external terminal.

11. The voltage converter according to claim 1, wherein a load is coupled to the voltage converter using the first external terminal and a voltage source is coupled to the voltage converter using the second external terminal.

12. A voltage conversion system, comprising:
    a voltage source;
    a load; and
    a voltage converter coupled to the voltage source and the load, wherein the voltage converter comprises:
        a third switch comprising:
            a first terminal; and
            a second terminal, wherein the second terminal of the third switch is grounded;
        a second energy storage comprising:
            a first terminal; and
            a second terminal coupled to a second external terminal of the voltage converter;

an energy storage circuit comprising:
   a first switch comprising:
     a first terminal coupled to a first external terminal of the voltage converter; and
     a second terminal;
   a second switch comprising:
     a first terminal coupled to the second terminal of the first switch; and
     a second terminal coupled to the second external terminal of the voltage converter;
   a first energy storage comprising:
     a first terminal coupled to the second terminal of the first switch; and
     a second terminal coupled to the first terminal of the third switch and the first terminal of the second energy storage; and
   a controller, configured to:
     during a first time period,
       control the first switch to be in an on state; and
       control the second switch and the third switch to be in an off state; and
     during a second time period,
       control the first switch to be in an off state; and
       control the second switch and the third switch to be in an on state, wherein the second time period is after the first time period.

13. The voltage conversion system according to claim 12, wherein the energy storage circuit further comprises: M third energy storages; M fourth switches, wherein a first terminal of a fourth switch i of the M fourth switches is coupled to the first external terminal; M fifth switches, wherein a first terminal of a third energy storage i of the M third energy storages is coupled to a second terminal of a fourth switch i of the M fourth switches and a first terminal of a fifth switch i of the M fifth switches, wherein i is a natural number and 1<i<M, and wherein a second terminal of the fifth switch i is coupled to the second external terminal; and M sixth switches, wherein a second terminal of a sixth switch i is grounded, wherein M is a positive integer, wherein i is equal to M, and wherein a second terminal of the third energy storage i is coupled to a first terminal of the sixth switch i and the first terminal of the first switch.

14. The voltage converter system according to claim 13, wherein during the first time period, all of the M fourth switches are configured to be in an on state while all of the M fifth switches and the M sixth switches are configured to be in an off state, and the voltage source further charges the M third energy storages, and wherein during the second time period, the M fourth switches are configured to be in an off state while all of the M fifth switches and the M sixth switches are configured to be in an on state, and the M third energy storages discharge to the load.

15. The voltage converter system according to claim 12, wherein the voltage converter further comprises a seventh switch, and wherein the seventh switch comprises:

a first terminal coupled to the first external terminal; and
a second terminal coupled to the first terminal of the third switch and the first terminal of the second energy storage, wherein the seventh switch is in an off state during both the first time period and the second time period.

16. The voltage converter system according to claim 12, wherein the first energy storage is a capacitor, and the second energy storage is an inductor.

17. The voltage converter system according to claim 12, wherein the voltage source is coupled to the voltage converter using the first external terminal and the load is coupled to the voltage converter using the second external terminal.

18. The voltage converter system according to claim 12, wherein the load is coupled to the voltage converter using the first external terminal and the voltage source is coupled to the voltage converter using the second external terminal.

19. A method for controlling a voltage converter, comprising:
sending, by a controller coupled to the voltage converter, a first driving signal to a first switch of an energy storage circuit in the voltage converter;
sending, by the controller, a second driving signal to a second switch of the energy storage circuit and a third switch of the voltage converter;
charging, by a voltage source coupled to the voltage converter, a first energy storage of the energy storage circuit and a second energy storage of the voltage converter during a first time period, wherein the first driving signal controls the first switch of the energy storage circuit to be in an on state during the first time period, and wherein the second driving signal controls the second switch of the energy storage circuit and the third switch of the voltage converter to be during an off state in the first time period; and
sending, by the controller, a third driving signal to the first switch;
sending, by the controller, a fourth driving signal to the second switch of the energy storage circuit and the third switch of the voltage converter, wherein the first energy storage of the energy storage circuit and the second energy storage of the voltage converter separately discharge to a load coupled to the voltage converter during a second time period following the first time period, wherein the third driving signal controls the first switch of the energy storage circuit to be in an off state during the second time period, and wherein the fourth driving signal controls the second switch of the energy storage circuit and the third switch of the voltage converter to be in an on state during the second time period.

20. The method according to claim 19, further comprising sending, by the controller, a fifth control signal to a seventh switch of the voltage converter, wherein the fifth control signal controls the seventh switch to be in an off state during both the first time period and the second time period.

* * * * *

UNITED STATES PATENT AND TRADEMARK OFFICE
CERTIFICATE OF CORRECTION

PATENT NO. : 10,826,395 B2
APPLICATION NO. : 16/539573
DATED : November 3, 2020
INVENTOR(S) : Jun Song and Pengfei Wang Page 1 of 1

It is certified that error appears in the above-identified patent and that said Letters Patent is hereby corrected as shown below:

In the Claims

Claim 2, Column 21, Line 42: "switch of the M fourth" should read "switch i of the M fourth"

Claim 2, Column 21, Line 47: "$1<i<M$" should read "$1 \leq i \leq M$"

Claim 4, Column 22, Line 3: "of a filth switch" should read "of a fifth switch"

Claim 4, Column 22, Line 4: "$1<i<M$" should read "$1 \leq i \leq M$"

Claim 13, Column 23, Line 37: "$1<i<M$" should read "$1 \leq i \leq M$"

Signed and Sealed this
Fifth Day of January, 2021

Andrei Iancu
*Director of the United States Patent and Trademark Office*